United States Patent [19]

Fuehrer

[11] Patent Number: 4,879,663
[45] Date of Patent: Nov. 7, 1989

[54] METHOD FOR DETERMINING POINTS IN SPACE GUIDING THE MOVEMENT OF A ROBOT ARM

[75] Inventor: Diethelm Fuehrer, Uttenreuth, Fed. Rep. of Germany

[73] Assignee: Siemens Aktiengesellschaft, Munich, Fed. Rep. of Germany

[21] Appl. No.: 71,481

[22] Filed: Jul. 9, 1987

[30] Foreign Application Priority Data

Jul. 9, 1986 [DE] Fed. Rep. of Germany ....... 3623070

[51] Int. Cl.$^4$ ............................................ G05B 19/18
[52] U.S. Cl. ........................................ 364/513; 901/2; 364/474.31; 318/573
[58] Field of Search ................................. 364/167–171, 364/474, 475, 513, 723, 853, 474.28–474.31; 318/573

[56] References Cited

U.S. PATENT DOCUMENTS

| | | | |
|---|---|---|---|
| 4,263,538 | 4/1981 | Richiardi | 318/568 |
| 4,409,650 | 10/1983 | Noguchi | 318/573 |
| 4,648,024 | 3/1987 | Kato et al. | 364/169 |

FOREIGN PATENT DOCUMENTS 1557915 1/1968 France .
1173396 12/1969 United Kingdom .

*Primary Examiner*—Allen MacDonald
*Attorney, Agent, or Firm*—Kenyon & Kenyon

[57] ABSTRACT

An ideal motion trajectory for a robot arm is first resolved into N successive linear segments comprising N+1 points. These N successive linear segments are then converted into a lesser number of linear robot arm linear motion sections in accordance with the predetermined position tolerance of the robot arm. The sum total of the linear robot arm motion arm. The lesser number of linear motion sections results in a substantial savings in data memory and at the same time tends to optimize an approximation of the ideal motion trajectory.

2 Claims, 5 Drawing Sheets

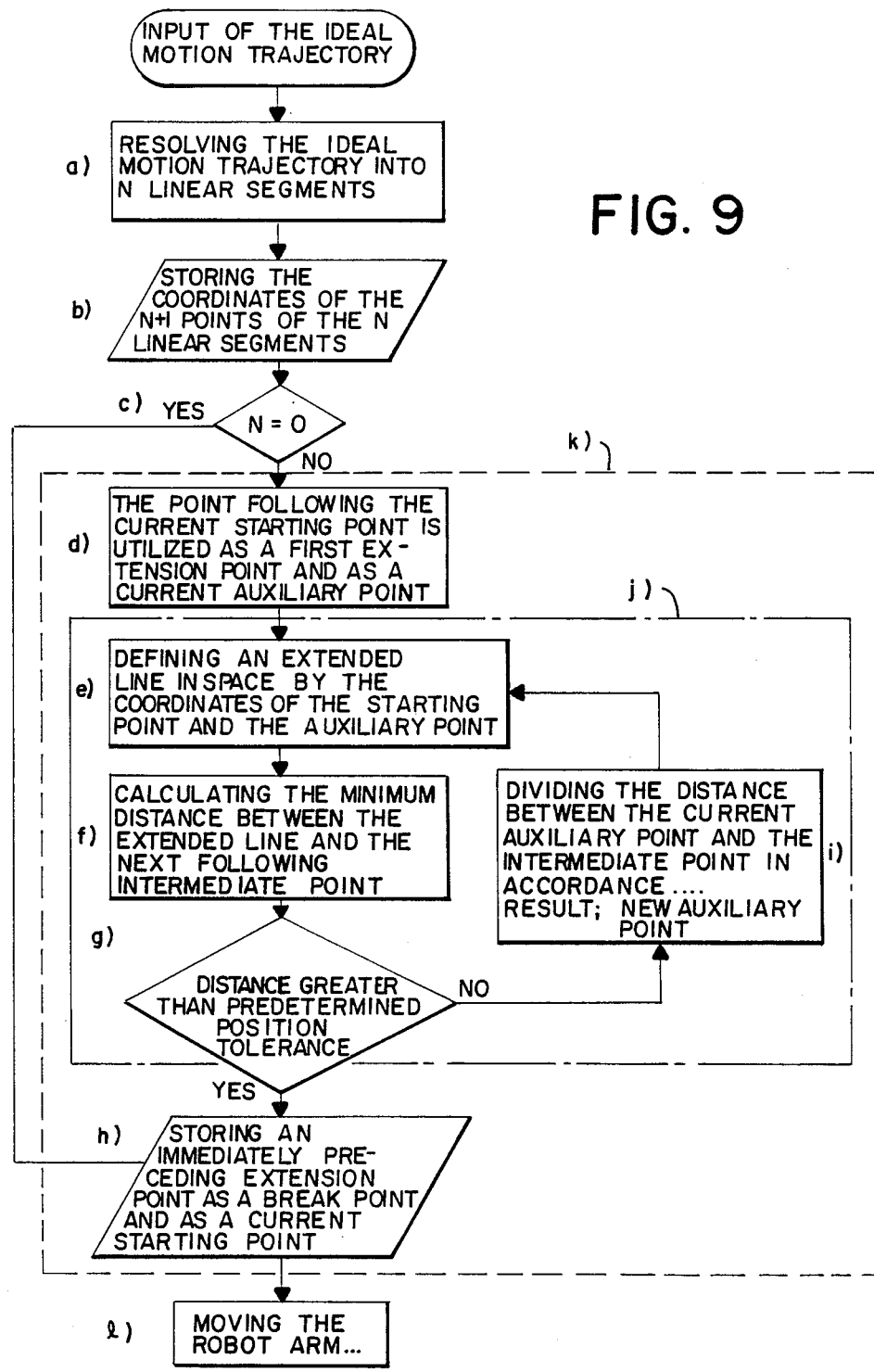

METHOD FOR DETERMINING POINTS IN SPACE GUIDING THE MOVEMENT OF A ROBOT ARM

BACKGROUND OF THE INVENTION

1. Technical Field

The invention relates to a method for determining points in space for guiding the movement of a robot arm, and, more particularly, for determining break points in successive linear motion sections which in total approximate an ideal robot arm motion trajectory.

2. Description of the Prior Art

For controlling the motion of robot arms, a desired ideal robot arm motion trajectory is resolved into a series of N short individual linear segments which approximate the trajectory. Each linear segment is determined by a beginning and an end point. A determination of break points, points at which the robot arm must physically change linear direction, should relate to a predetermined position tolerance of the particular robot arm, the position tolerance being defined as the minimum distance a given robot arm is capable of traveling without appreciable error. Such a system which considers the predetermined position tolerance of a particular robot arm is known. Due to the fact that only the robot arm motion break points need to be provided to a control system for the robot arm and movement between these break points is controlled by an interpolator, a fast and technically simple control of the robot arm motion trajectory is obtained.

A robot arm trajectory, however, need not comprise as many motion sections as linear segments Consequently, the problem with prior art robot arm control is that they do not tend to optimize the determination of break points for the robot arm motion sections. The determination of the break points, in prior art systems, is done individually by means of a manual-motion key at a robot arm control panel or through a particular calculation algorithm developed by a computer programmer. Thus, in the case of manually manipulating a robot arm through its path, the determination of the break points depends on the skill of the operator. In the case of a separate computer calculated determination, the skill of the programmer is critical. Both prior art methods lead to reproducible solutions only if the trajectory relates to clearly distinguishable geometric forms.

Prior systems of this nature are disclosed in French Pat. No. 1,557,915 and U.S. Pat. No. 4,263,538, the disclosure of which is hereby incorporated by reference.

Thus, there is a need in the art for an automatic method of determining break points which efficiently takes into consideration the position tolerance of the particular robot arms and, at the same time, limits the number of necessary break points to a number less than were involved in an initial resolution of the trajectory path.

SUMMARY OF THE INVENTION

The problems and related problems of prior art arrangements and methods are solved by the principles of the present invention. A method of determining break points for the movement of a robot arm in accordance with the present invention comprises the following steps:

(a) resolving the ideal motion trajectory into N short linear segments from a starting point, the first point of the ideal motion trajectory, through N-1 intermediate points, to a final point, the destination point of the ideal motion trajectory;

(b) storing the coordinates of all N+1 points of the N ideal motion trajectory linear segments;

(c) storing the coordinates of the starting point of the trajectory as a current starting point of a first extended line and therefore as a first point in space through which the robot arm is capable of moving;

(d) utilizing the intermediate point on the ideal motion trajectory immediately following the current starting point as a first extension point and as a current auxiliary point for a temporary fixation of the extended line in space from the current starting point through the current auxiliary point toward a current extension point;

(e) defining the extended line in space by the coordinates of the respective current starting point and the coordinates of the current auxiliary point;

(f) establishing the current extension point on the extended line as that point on the extended line closest to a next previously unconsidered intermediate point on the ideal motion trajectory;

(g) calculating the minimum distance between the next previously unconsidered intermediate point of the ideal motion trajectory and the current extension point;

(h) if the distance is greater than a predetermined position tolerance for the robot arm, storing the immediately preceding extension point in memory as the break point of a robot arm linear motion section and as a current starting point of a subsequent robot arm linear motion section;

(i) if the distance is less than the predetermined position tolerance of the robot arm, dividing the distance between the current auxiliary and the just considered intermediate point on the ideal motion trajectory in accordance with a count of the already considered intermediate points since the determination of the current starting point and relocating the current auxiliary point to a dividing point closest to the current auxiliary point;

(j) in this event, repeating the process steps (e), (f), (g), (h) and (i) until the test of step (h) is satisfied;

(k) repeating steps (d) through (j) until all N+1 trajectory points have been considered.

In this method, the determined break points in space are relatively distant from each other. The less the curvature of the robot arm motion trajectory the farther the break points are separate from each other. This results in a data reduction compared with the N+1 points of the N original short linear segments which facilitates optimum utilization of data storage, and unnecessarily short motion sections are avoided.

In one embodiment of the invention, the division of the distance from the current auxiliary point to the next point on the trajectory is by dividing a line between the points into equal length segments according to process step (j). Thereby, an extremely simple relationship is obtained according to which the relocation of a current auxiliary point is varied depending on a count of points on the trajectory already taken into consideration since the determination of the last break point.

BRIEF DESCRIPTION OF THE DRAWING

FIG. 9 is a flow chart of the steps executed to obtain the motion described in FIGS. 2-8 using the apparatus diagramed in FIG. 1.

DETAILED DESCRIPTION

Figure 1:
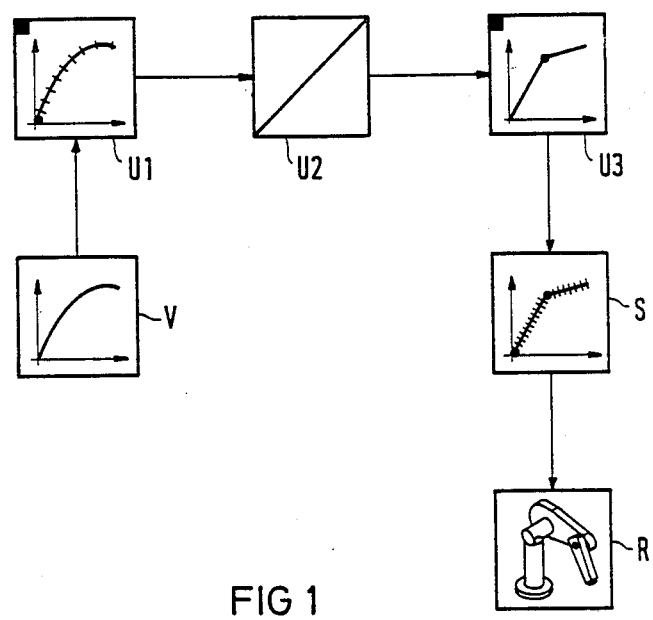
FIG. 1 is a block diagram of a device, for carrying out the method according to the invention.

Referring to the block diagram of FIG. 1, a robot R has an arm the motion of which is to be controlled in accordance with an ideal motion trajectory, as is given by a pattern V. The pattern V, be it a printed pattern or derived from a model is scanned by means of a converter U1, and the ideal motion trajectory is resolved by the converter U1 into N short linear segments from a start point on the trajectory, a first robot arm location, to a final robot arm location, the last point on the trajectory. The N short linear segments can be approximately equidistant from each other. In the converter U1, all the coordinates of the N+1 points along the ideal motion trajectory are subsequently stored in accordance with a predetermined coordinate system. The stored coordinates of the N+1 points are fed to a second converter U2 with the aid of which the break points of successive robot arm linear motion sections are determined according to the method of the present invention. The totality of these break points approximates the ideal motion trajectory for the robot R having a predetermined position tolerance. The coordinates of the break points (two are shown) are stored in a third converter U3 and are then made available to a controller S for the robot R, where the controller S makes possible an interpolation of the linear motion sections from one break point to the next, if necessary.

The aforementioned elements may be implemented using conventional means such as commercially available miniprocessors or microprocessors, cf. U.S. Pat. No. 4,263,538.

Figure 2:
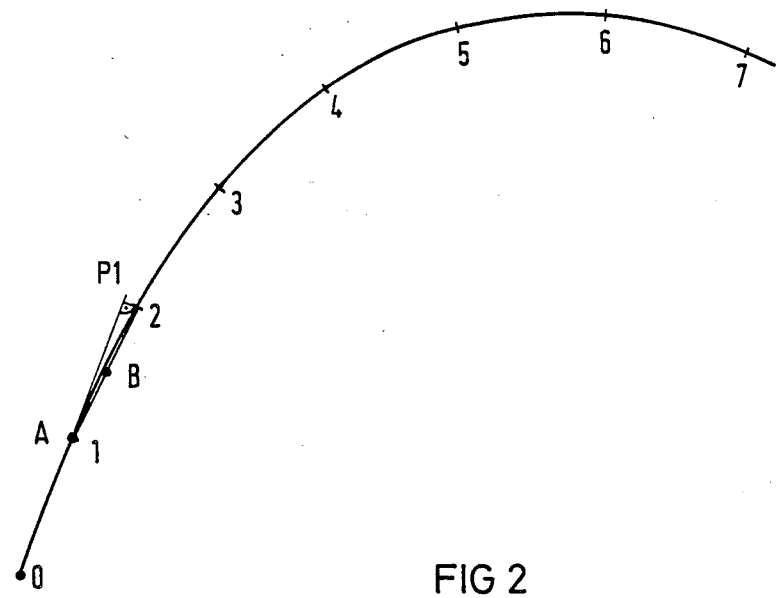
FIGS. 2 to 8 are graphical representations of a curved trajectory example of an ideal motion trajectory indicating the process steps which lead from the ideal motion trajectory to a lesser number of robot arm linear motion sections approximating the trajectory.

In the trajectory of FIG. 2, the ideal motion trajectory for the robot R is shown by way of example to comprise a curved pattern. A location 0 is assumed as the starting point of the ideal motion trajectory, and a point 7 as the destination. Between these two points 0 and 7, the intermediate points 1 through 6 are arranged along approximately equidistant short linear segments. (The points 0 and 7 are indicated by marks on the ideal motion trajectory.) According to the method of the present invention, the starting point 0 of the trajectory is chosen as a first starting point of a first extended line. The point on the ideal motion trajectory immediately following this starting point, i.e., the point 1, is utilized as a current auxiliary point A for preliminarily fixing an extended line starting at point 0 through point A toward the next point 2 along the trajectory. Thus, the extended line is obtained from the starting point 0 through the auxiliary point A and extends to a point P1 having a minimal distance from the next point 2 on the trajectory. In the example shown, the starting point of the extended line as well as all subsequent auxiliary points are marked by circular dots.

Figure 3:
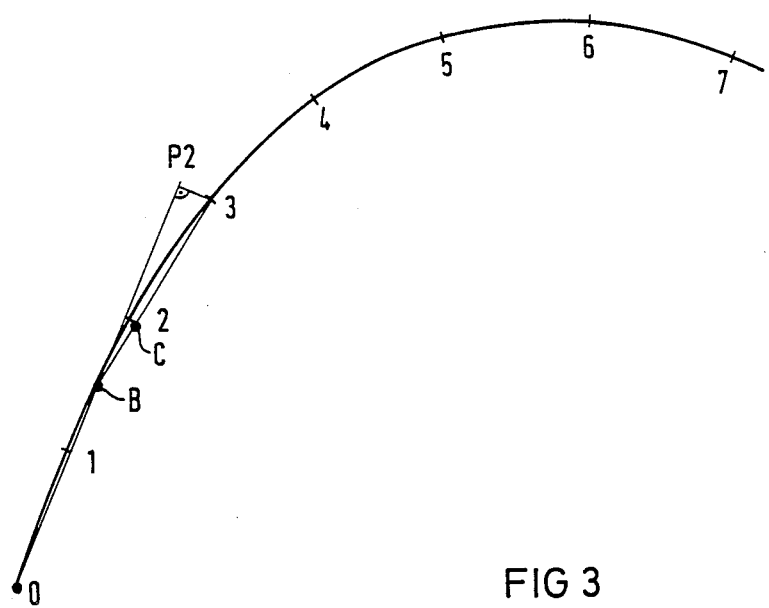

In this example, it is assumed that the distance to the next point 2 from the extension point is smaller than a given position tolerance for the robot arm. In accordance with the present method, the position of the auxiliary point A is then relocated to a new auxiliary point B which is located between point 2, the just considered point on the trajectory, and the current auxiliary point A. This means that the direction of the first extended line (or first attempted robot arm linear motion section) has been corrected as indicated in FIG. 3. A new extended line or attempted robot arm linear motion section is now defined by an extended line which extends from the current starting point 0 through the new current auxiliary point B. In the event there are just two linear motion segments or three points on the trajectory to be considered, a default approximation of trajectory 0-1-2 according to the present invention may be the extended line from point 0 through point B toward point 2. The present invention is best applied in situations where there are a large number N of linear segments and a relatively high predetermined position tolerance so that a large data reduction results.

Referring to FIG. 3, a new extension point P2 is established on the new extended line closest to the next point 3 on the trajectory. The distance from the new extension point P2 (or from the extended line through points 0 and B) to point 3 is now calculated. In the example shown, it is again assumed that this new distance is still smaller than the predetermined position tolerance. Since this is now the third short linear segment that has been taken into consideration since the determination of the current starting point 0, current auxiliary point is again relocated. It is relocated along a distance between the auxiliary point B and the just considered point 3 on the trajectory in such a manner that this distance between the auxiliary point B and the point 3 on the trajectory is divided into three parts. The division point nearest the current auxiliary point becomes the new current auxiliary point, that is, the point C now is established in memory as the new current auxiliary point.

Figure 4:
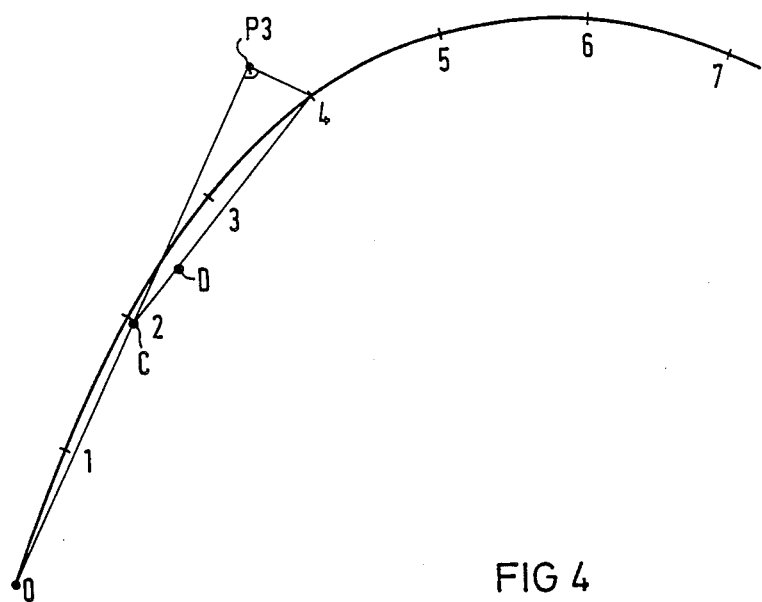

In the presentation according to FIG. 4, it is shown how a new extended line or attempted robot arm linear motion section is extended from the current starting location 0 through the current auxiliary point C. In this example, it is assumed that the resulting extended line has a minimum distance from the point 4 of the ideal motion trajectory such that the distance is still smaller than the predetermined position tolerance. Accordingly, a new current auxiliary point is determined which lies on the line between the current auxiliary point C and the next location 4 on the trajectory. The distance between points C and 4 is divided into four parts since now the fourth point on the trajectory or linear segment is being considered since the determination of the current starting point 0. The division point nearest to point C is point D. A new extended line starting from the starting point 0 now runs, as is shown in FIG. 5, from point 0 through point D to a point closest to the next point on the trajectory to be considered, point 5.

Figure 5:
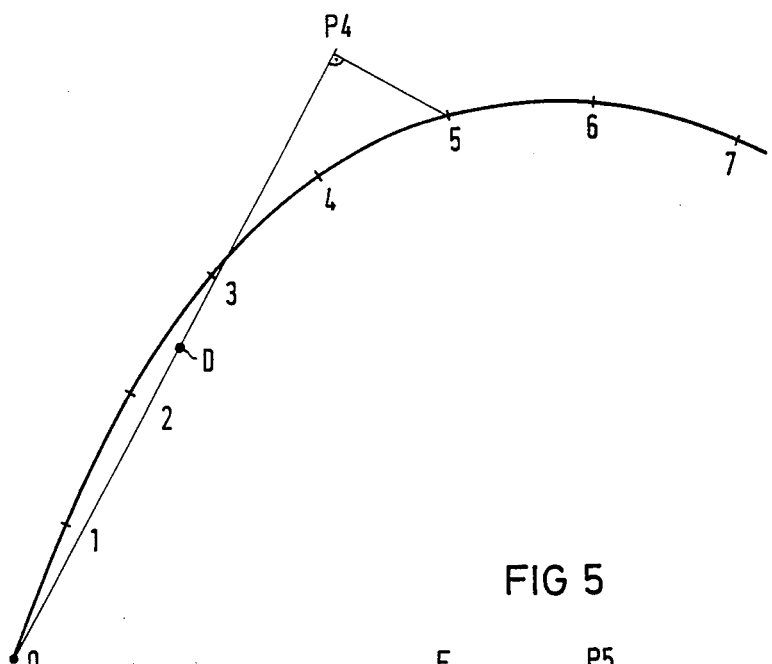

Referring to FIG. 5, the event finally occurs that the resulting minimum distance to point 5 from extension point P4 has a length which is larger that the predetermined position tolerance of the robot arm. In this case, the end point, in other words, the first break point of the first linear motion section is determined as the preceding extension point, namely the extension point on the extended line through the points 0 and C toward the point 4 on the trajectory. This end point is shown in FIG. 4 as the break point P3.

Figure 6:
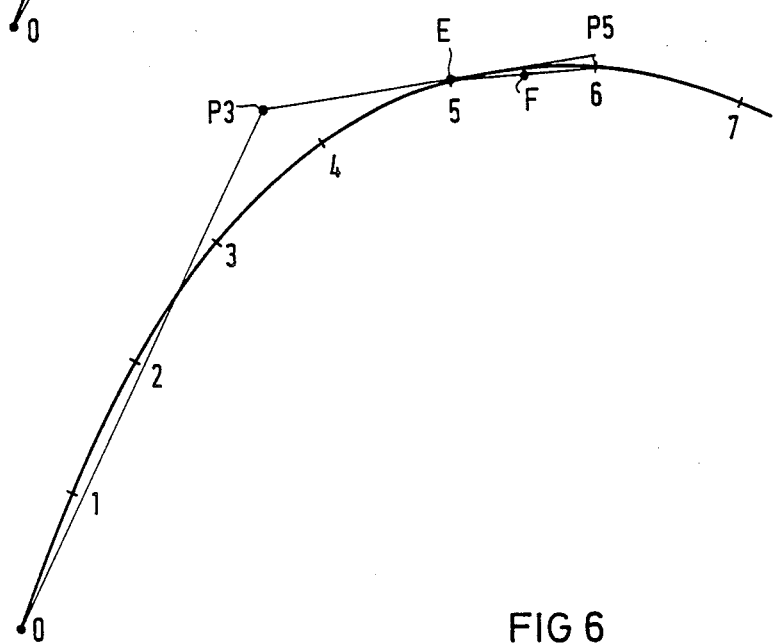

Referring now to FIG. 6, it is shown how the second linear motion section is obtained by the method according to the present invention. The break point P3 is now chosen as the current starting point for the second linear motion section, and the point 5 of the ideal motion trajectory is selected as the current auxiliary point for locating the first extended line or attempted second robot arm linear motion section. That is point 5 is made the current auxiliary point E. This straight line from point P3 through point E is examined as to its distance from the next point 6 on the trajectory and, since in the example shown, the resulting distance is assumed to be smaller than the predetermined position tolerance, the distance between the location 5 which had served as a preliminary auxiliary point E is divided by two, there having been two points on the trajectory considered since the selection of the current starting point P3. The new current auxiliary point G is determined to be at a location half the distance between points 5 and 6.

Figure 7:
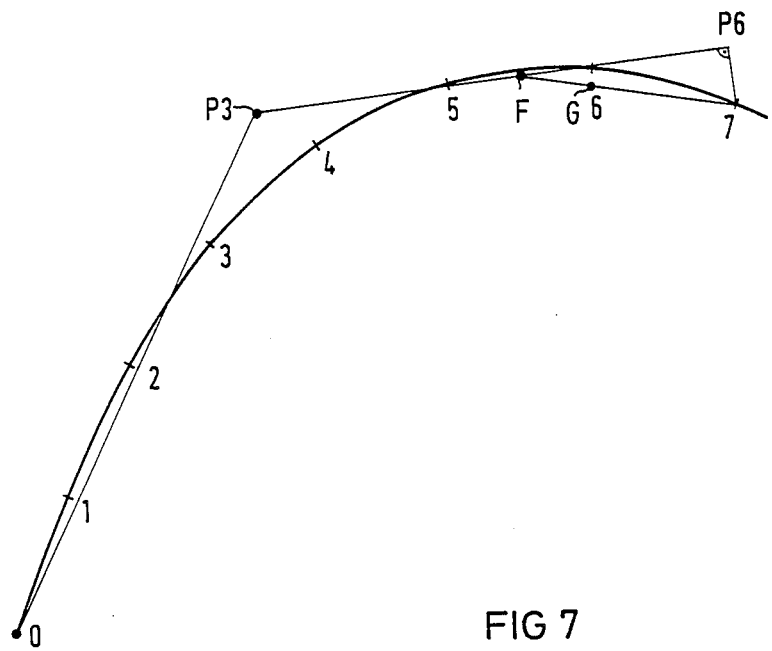

In accordance with FIG. 7, the next step of the present method involves extending a straight line from the first break point P3 through the new auxiliary point F toward the next (and last) point 7 of the trajectory. The minimum distance from location 7 to the extended line (at extension point P6) is determined as is shown in FIG. 7. Since the resulting distance is assumed to be smaller than the predetermined position tolerance and since three short linear segments and three points on the trajectory have been taken into consideration since the determination of the current starting point or break point P3 for the second motion section, the distance between the last point 7 of the ideal motion trajectory and the current auxiliary point F is divided into three parts. The division point closest to the last auxiliary point F becomes the new current auxiliary point G. Now, there are no more trajectory points to consider, the last point 7 having already been considered.

Figure 8:
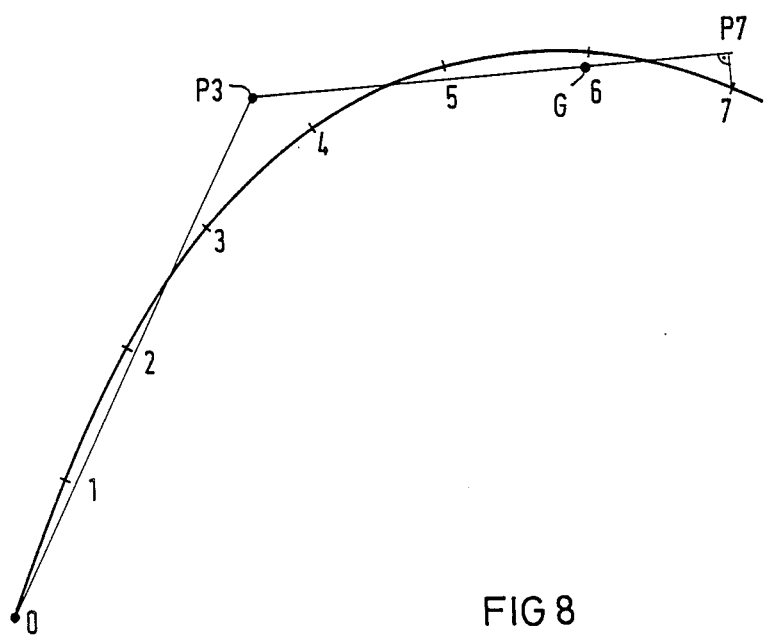

Referring to FIG. 8, the final break point for the location of the second linear motion section may be determined along the extended line from the break point E through the current auxiliary point G. The robot arm may stop, for example, at extension point P7 closest on the extended line through points P3 and G to the last trajectory point 7.

Referring briefly to FIG. 1, the ideal motion trajectory may be approximated by two linear motion sections just established which are then interpolated by the controller of the robot.

FIG. 9 is a flow chart illustrating the processing steps used to manipulate the robot art as described above.

While in the example shown, the ideal motion trajectory extends in a two-dimensional plane, it is also possible to apply the present method to a motion trajectory set in three-dimensional space, a three-dimensional movement being within the capability of many industrial robots. It is also conceivable that an ideal motion trajectory may be determined by circular motion sections rather than linear sections which in prior art controllers can likewise be interpolated without particular difficulty.

What is claimed is:

1. A data processing method for determining points in space guiding the control of a robot arm having a predetermined position tolerance, the points defining break points in successive continuous linear motion sections of the robot arm which, in total, approximate an ideal motion trajectory for the robot arm, the method comprising the steps of:
   (a) resolving by means of a converter the ideal motion trajectory into N short linear segments from a starting point on the ideal motion trajectory, through N-1 successive intermediate points, to a destination point on the ideal motion trajectory;
   (b) storing the coordinates of the N+1 points of the N ideal motion trajectory linear segments;
   (c) storing the coordinates of the starting point of the trajectory as a current starting point of a first extended line and therefore as a first point in space from which the robot arm is to be moved;
   (d) utilizing the intermediate point on the ideal motion trajectory immediately following the current starting point as a first extension point and as a current auxiliary point for a temporary fixation of the extended line in space from the current starting point through the current auxiliary point toward a current extension point;
   (e) defining the extended line in space by the coordinates of the current starting point and the coordinates of the current auxiliary point;
   (f) establishing the current extension point on the extended line as that point on the extended line closest to a next following previously unconsidered intermediate point on the ideal motion trajectory;
   (g) calculating the minimum distance between the next following previously unconsidered intermediate point on the ideal motion trajectory and the current extension point;
   (h) if the distance is greater than the predetermined position tolerance of the robot arm, storing an immediately preceding extension point in memory as the break point of a robot arm linear motion section and as a current starting point of a subsequent robot arm linear motion section;
   (i) if the distance is less than the predetermined position tolerance of the robot arm, dividing the distance between the current auxiliary point and the just considered intermediate point on the ideal motion trajectory in accordance with a count of the already considered intermediate points since the determination of the current starting points and relocating the current auxiliary point to a dividing point closest to the current auxiliary point;
   (j) repeating the process steps (e) through (i) until the test of step (h) is satisfied;
   (k) repeating steps (d) through (k) until all N+1 trajectory points have been considered; and
   (l) moving the robot arm between the points in space determined in steps (a)-(k).

2. A data processing method according to claim 2, in the relocation of the current auxiliary point to a dividing point closest to the current auxiliary point, establishing the dividing point by dividing a line between the current auxiliary point and the just considered intermediate point into equal length line segments, the dividing point being the terminal point of the equal length line segment beginning at the current auxiliary point.

* * * * *